US012791990B2

(12) United States Patent
De Guzman et al.

(10) Patent No.: US 12,791,990 B2
(45) Date of Patent: Nov. 10, 2026

(54) METHODS AND APPARATUS FOR EXECUTING RULES

(71) Applicant: Fisher-Rosemount Systems, Inc., Round Rock, TX (US)

(72) Inventors: Francis De Guzman, Pasig City (PH); Ching Lung Tjiong, Round Rock, TX (US); Paul Oliver Serapio Fos, Pasay City (PH); Dashene Aren Samson, Quezon City (PH)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 726 days.

(21) Appl. No.: 17/945,624

(22) Filed: Sep. 15, 2022

(65) Prior Publication Data

US 2024/0094684 A1 Mar. 21, 2024

(51) Int. Cl.
*G05B 13/04* (2006.01)

(52) U.S. Cl.
CPC .................................... *G05B 13/04* (2013.01)

(58) Field of Classification Search
None
See application file for complete search history.

(56) References Cited

U.S. PATENT DOCUMENTS 5,058,088 A * 10/1991 Haas ........................ G07C 1/30
368/327
6,138,249 A 10/2000 Nolet
6,741,898 B2 5/2004 Baumgartner et al.
10,785,049 B2 * 9/2020 Brun ................... H04L 12/2803
2007/0005266 A1 1/2007 Blevins et al.
2007/0038321 A1 * 2/2007 McDonald ............. G05B 17/02
703/2
2007/0150081 A1 * 6/2007 Nixon ................... H04L 67/289
700/83
2007/0174225 A1 * 7/2007 Blevins ................... H04L 67/51
340/3.9

(Continued)

FOREIGN PATENT DOCUMENTS

JP 2001175972 A * 6/2001

OTHER PUBLICATIONS

International Searching Authority, "International Search Report," issued in connection with International Application No. PCT/US23/74228, mailed on Nov. 28, 2023, 2 pages.

(Continued)

*Primary Examiner* — Jennifer L Norton
(74) *Attorney, Agent, or Firm* — Hanley, Flight & Zimmerman, LLC

(57) ABSTRACT

Methods, apparatus, systems, and articles of manufacture are disclosed. An apparatus for executing a rule includes at least one memory, machine readable instructions, and processor circuitry to at least one of instantiate or execute the machine readable instructions to access a property value from a data collector, the property value including an operational value of a workstation within a process control system, create a data model instance representing the workstation, apply the property value to the data model instance, identify a rule associated with the data model instance, cause execution of an executable package associated with the rule using the data model instance; and record a result of the execution of the executable package.

20 Claims, 12 Drawing Sheets

(56) References Cited

U.S. PATENT DOCUMENTS

| | | | | |
|---|---|---|---|---|
| 2007/0179641 | A1* | 8/2007 | Lucas | G06F 8/38 700/83 |
| 2007/0211079 | A1* | 9/2007 | Nixon | H04L 67/75 345/619 |
| 2009/0018671 | A1* | 1/2009 | Srinivasan | G05B 17/02 700/1 |
| 2010/0058248 | A1* | 3/2010 | Park | G06F 3/0481 715/851 |
| 2012/0254090 | A1* | 10/2012 | Burris | G06N 5/027 706/47 |
| 2013/0159260 | A1* | 6/2013 | VanGompel | G05B 19/4183 707/690 |
| 2013/0317629 | A1* | 11/2013 | Shapiro | G05B 13/04 700/31 |
| 2014/0031958 | A1* | 1/2014 | Loganathan | G05B 23/0229 700/79 |
| 2014/0032169 | A1* | 1/2014 | McCarthy | G05B 19/4184 702/182 |
| 2014/0089342 | A1 | 3/2014 | Takayanagi et al. | |
| 2014/0114939 | A1* | 4/2014 | Spacek | G06F 16/21 707/694 |
| 2015/0120912 | A1* | 4/2015 | Tewari | H04L 43/16 709/224 |
| 2016/0033941 | A1* | 2/2016 | T | G06F 8/65 700/81 |
| 2017/0236067 | A1* | 8/2017 | Tjiong | G05B 23/0229 706/11 |
| 2017/0261969 | A1* | 9/2017 | Peake | G05B 19/41835 |
| 2018/0074483 | A1* | 3/2018 | Cruz | G05B 23/0283 |
| 2020/0301595 | A1 | 9/2020 | Akutsu et al. | |
| 2020/0401124 | A1* | 12/2020 | Dillon | G05B 23/0283 |
| 2021/0034034 | A1* | 2/2021 | Cook | G06F 16/2455 |
| 2022/0075515 | A1* | 3/2022 | Floren | G06F 3/04847 |
| 2022/0100175 | A1* | 3/2022 | Riju | G05B 19/0426 |
| 2024/0255921 | A1* | 8/2024 | Fu | G05B 19/418 |

OTHER PUBLICATIONS

International Searching Authority, “Written Opinion,” issued in connection with International Application No. PCT/US23/74228, mailed on Nov. 28, 2023, 4 pages.

European Patent Office, “Extended European Search Report,” issued in connection with European Patent Application No. 23866492.4, dated Aug. 27, 2026, 10 pages.

* cited by examiner

METHODS AND APPARATUS FOR EXECUTING RULES

This disclosure relates generally to process control systems and, more particularly, to methods and apparatus for executing rules.

BACKGROUND

Process control systems are used in manufacturing and/or industrial settings to control processes (e.g., manufacturing processes). During such processes, machines are operated to produce an output. Operators of such process control systems desire to know when particular elements in the process control system are operating out of tolerance and/or malfunctioning. Such operation out of tolerance and/or malfunctioning might require operator intervention to correct an error in the process control system.

BRIEF DESCRIPTION OF THE DRAWINGS

In general, the same reference numbers will be used throughout the drawing(s) and accompanying written description to refer to the same or like parts. The figures are not to scale.

Figure 1:
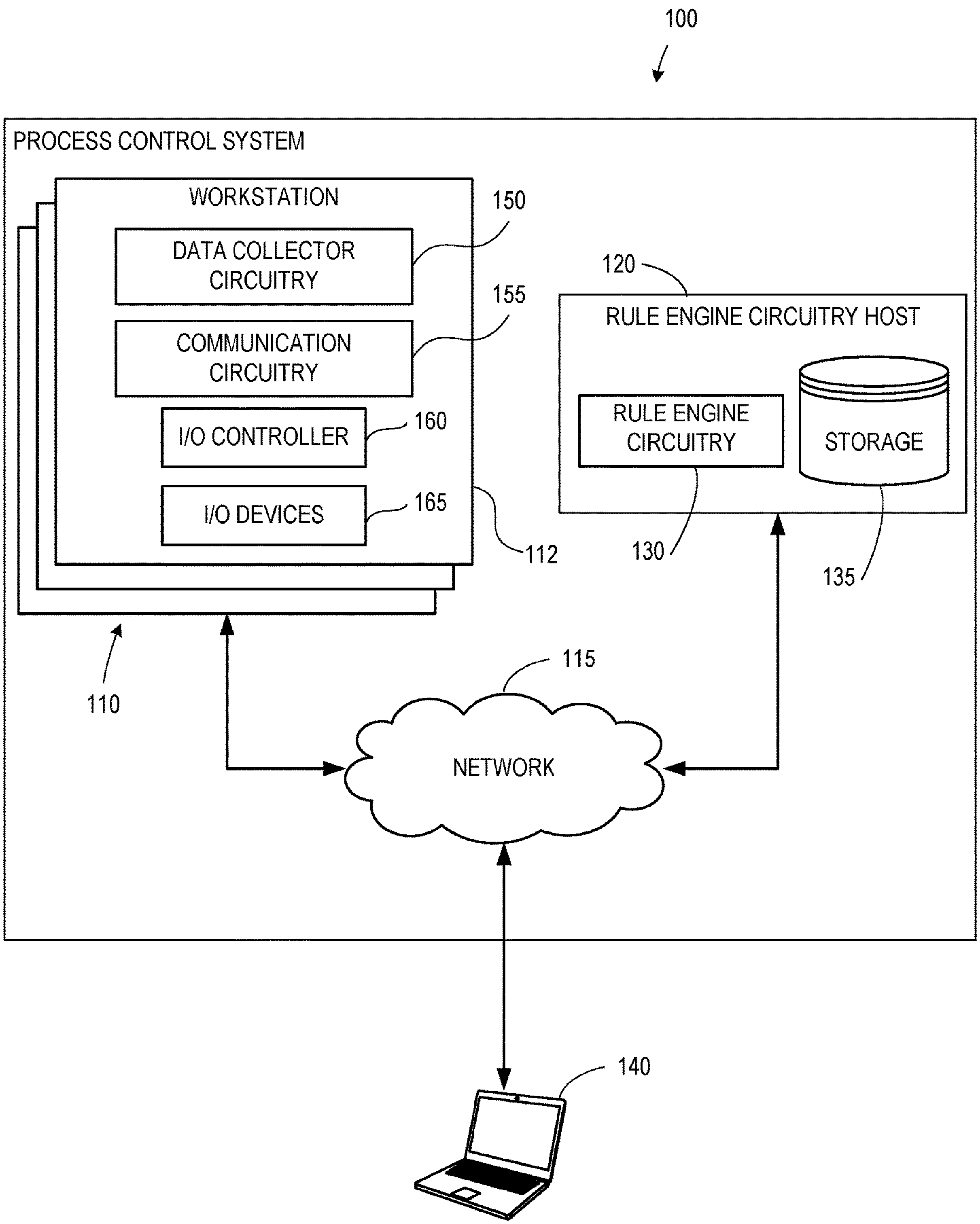
FIG. 1 is a schematic illustration of a process control system.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

SUMMARY

To effectively operate processes within a process control system, components (e.g., workstations) of the process control system must be functional and/or operating within normal operational limits. In existing process control systems, workstations within the process control system each execute their own logic for determining whether the workstation is functional and/or operating within normal operational limits. If a workstation is not operating within its operational limits, an operator can be notified so the operator can intervene and resolve the problem before it becomes catastrophic to the system.

In existing implementations, rules for evaluating the operational status of a workstation are executed within each respective workstation, individually. Some of those rules for evaluating the operational status of a workstation might be the same for multiple workstations within the process control system. If, for example, a rule common to multiple workstations is to be updated, potential errors in updating each workstation individually may occur and, thus, the likelihood of an error occurring increases due to the number of potential sources of error.

For example, a workstation may execute a rule on a defined list of parameters to determine if any of the parameters has exceeded a defined threshold. The output of the execution of the rule is an indication (e.g., a report) indicating a pass (the parameter was within an operational range) or a fail (the parameter was not within the operational range) for each parameter. In this example, the list of parameters as well as the logic for checking the parameters against the thresholds are embedded in the workstation itself. If the rule logic needs to be changed on this workstation, such as updating threshold values or changing parameters, an operator would have to make those changes on that individual workstation, and no other workstation within the system of workstations would receive that change. Thus, it is not possible to leverage the work done for one product (e.g., a workstation) and use it in another and the products are costly to maintain.

To further exacerbate error risks, existing rules are deployed as executable constructs. In other words, the rules are stored at each workstation as a compiled executable that is to be executed at the workstation. Because the rules are compiled, changes to the rules requires re-compilation. Process control system operators typically employ strict quality control measures that require full validation testing of executables before they are deployed to a workstation. For example, before a provider of a process control system installs an executable at a workstation, that executable must undergo a number of tests to validate that it operates correctly under different potential conditions that might occur at the workstation (e.g., the workstation executes a particular operating system and/or has particular updates and/or other configurations applied). Such testing may cause delays in deployment of updated rules, even when changes to such rules are minor (e.g., adjusting an expected temperature range).

Therefore, there exists a need for a process control system in which the rules to be executed are stored and/or executed in a common location. A need also exists for a process control system in which a common rule executor is implemented where the logic for executing a series of rules does not need to be modified after modifying a rule. Implementing such a system greatly reduced maintenance costs and the probability of errors in updating individual rules. Examples disclosed herein execute one or more rules by a rule executor that is used by one or more workstations.

DETAILED DESCRIPTION

FIG. 1 is a schematic illustration of a process control system 100. The example process control system 100 includes a plurality of workstations 110, a network 115, a rule engine circuitry host 120, and a remote device 140. The rule engine circuitry host 120 communicates via the network 115 to the plurality of workstations 110. In some examples, the process control system 100 enables communication with the remote device 140. The remote device 140 may be operated by an operator to, for example, control the operations of the process control system 100, receive and/or display alerts from rule engine circuitry 130, etc.

The network 115 can be any one of or combination of a public network, a Virtual Private Network (VPN), a private network, or any other similar communication platform to enable two or more computing devices to communicate.

The example rule engine circuitry host 120 includes example rule engine circuitry 130 and example storage 135. The rule engine circuitry 130 controls the management and execution of the rule(s) within process control system 100. The rule engine circuitry 130 creates a workstation instance (e.g., a data model instance) for each of the plurality of workstations 110, determines which rules need to be executed, where the rules are stored, whether the rule is executable, executes the rule, and reports the result of the rule execution to a web-based interface and/or a graphical user interface (GUI). In some examples, the rule engine circuitry 130 stores the results of the rule execution in the storage 135.

The storage 135 of the illustrated example of FIG. 1 stores one or more of rules, executables, results, etc., to be accessed by the rule engine circuitry 130. The storage 135 may be implemented by one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.). In some examples, the rule engine circuitry 130 is instantiated by processor circuitry executing rule engine circuitry 130 instructions and/or configured to perform operations such as those represented by the flowchart of FIGS. 5, 6, and/or 8.

The rule engine circuitry 130 identifies the plurality of workstations 110 through data communicated over the network 115 from data collector circuitry 150. The data collector circuitry 150 stores information relative to the workstation(s) 110 that the rule engine circuitry 130 requests to execute a rule. In some examples, the information (e.g., property values) retrieved by the rule engine circuitry 130 from the data collector circuitry 150 may include parameters such as CPU utilization, storage utilization, temperature readings, or any other information related to workstation system health and performance. In some examples, the property values may include parameters defining the data model instance (e.g., Internet Protocol (IP) Address, workstation identification information, etc.).

As used herein, a rule includes one or more instructions the rule engine circuitry 130 is to perform during execution. The rule defines which parameters the rule engine circuitry 130 retrieves from the data collector circuitry 150 as property values, and then analyze those retrieved property values against thresholds also defined in the rule. The output of the rule contains information that includes the health of the system and/or any other combination of information necessary to analyze the health of the system. An example rule is further discussed below in connection with FIG. 4.

The rule engine circuitry 130 processes rules to create an executable construct(s) representing the rule that can be executed against data provided by the data collector circuitry 150 of the workstation(s) 110. Responsive to an evaluation of the rule (e.g., by executing the executable construct(s) representing the rule) the rule engine circuitry 130 may present an alert and/or other notification to an operator of the process control system 100. An example implementation of the rule engine circuitry 130 is further disclosed below in connection with FIG. 3.

The workstation 112 processes rule execution instructions passed from the rule engine circuitry 130 to read property values from one or more I/O devices 165 and create outputs that are sent back to the rule engine circuitry 130. The communication to/from the rule engine circuitry 130 is handled through communication circuitry 155. For example, the rule engine circuitry 130 may request property values of the workstation 112 storage utilization. In this example, the rule engine circuitry 130 sends a command to the data collector circuitry 150 to access the workstation 112 storage utilization and pass the result back to the rule engine circuitry 130 to analyze the property values against the threshold defined in the rule. As another example, the rule engine circuitry 130 may request actuator health information from the workstation 112. In this example, the data collector circuitry 150 receives a command from the rule engine circuitry 130 to activate the actuator, which causes the data collector circuitry 150 to send a command to the actuator to activate. The resulting response from the actuator is then sent to the rule engine circuitry 130 for an analysis of the health of the actuator.

The data collector circuitry 150 of the illustrated example of FIG. 1 aggregates device information from the I/O controller 160 which controls the operation of the I/O devices 165. The data collector circuitry 150 accesses information about the health of the process control system 100 and then passes that information to the rule engine circuitry 130 over the network 115. In some examples, the data collector circuitry 130 may store the information accessed from the I/O controller 160 on an internal storage device housed within the data collector circuitry 150. The rule engine circuitry 130 may then access the information from the internal storage device via the network 115. In some examples, the data collector circuitry 150 may send the information accessed from the I/O controller 160 to the rule engine circuitry 130 over network 115 without storing the information. In this example, the rule engine circuitry 130 determines whether to store the information. The determination of whether to store the information may include whether the rule engine circuitry 130 may need to access the information multiple times, whether the rule engine circuitry 130 may need to keep a record of results, etc.

The communication circuitry 155 of the illustrated example of FIG. 1 is a communication link between the rule engine circuitry 130 and the data collector circuitry 150. In some examples, the communication circuitry 155 may access the information stored on the data collector circuitry 150 and send the information to the rule engine 130 over the network 115. The communication circuitry 155, in this example, may also receive information from the rule engine circuitry 130 (e.g., rule execution commands, which parameters to retrieve property values of, etc.) and passes that information to the data collector circuitry 150.

The I/O controller 160 of the illustrated example of FIG. 1 controls the operation of and reads the property values of the I/O devices 165. In some examples, the I/O controller 160 may receive an instruction from the data collector circuitry 150 to access the CPU utilization (an I/O device 165) of the workstation 112. The I/O controller 160, through its own set of instructions, may read the CPU utilization of the workstation 112 and pass that property value back to the data collector circuitry 150. For example, the I/O controller 160 may receive an instruction to open and close a valve (an I/O device 165) from the data collector circuitry 150 to verify the operational status of the valve. The I/O controller 160 may command the valve to open and close, and subsequently reads the values associated with the operational check (such as whether the valve opened, whether the valve closed, the percentage in which the valve opened, etc.) from the valve to pass back to the data collector circuitry 150.

The I/O devices 165 of the illustrated example of FIG. 1 may include any assortment of physical sensors, actuators, components, etc. that are operated and/or read by the data collector circuitry 150 on the workstation 112. The I/O devices 165 include the physical property values that the data collector circuitry 150 may access and send to the rule engine circuitry 130 to execute the rule on those property values to determine the health of the process control system 100.

The remote device 140 of the illustrated example of FIG. 1 communicates with the process control system 100 to control operations of the process control system 100 and/or display alerts at the request of the rule engine circuitry 130. In the illustrated example of FIG. 1, the remote device 140 is allowed to communicate via the network 115. However, in some examples, a separate network may be provided to enable communications with elements of the process control system 100.

Figure 2:
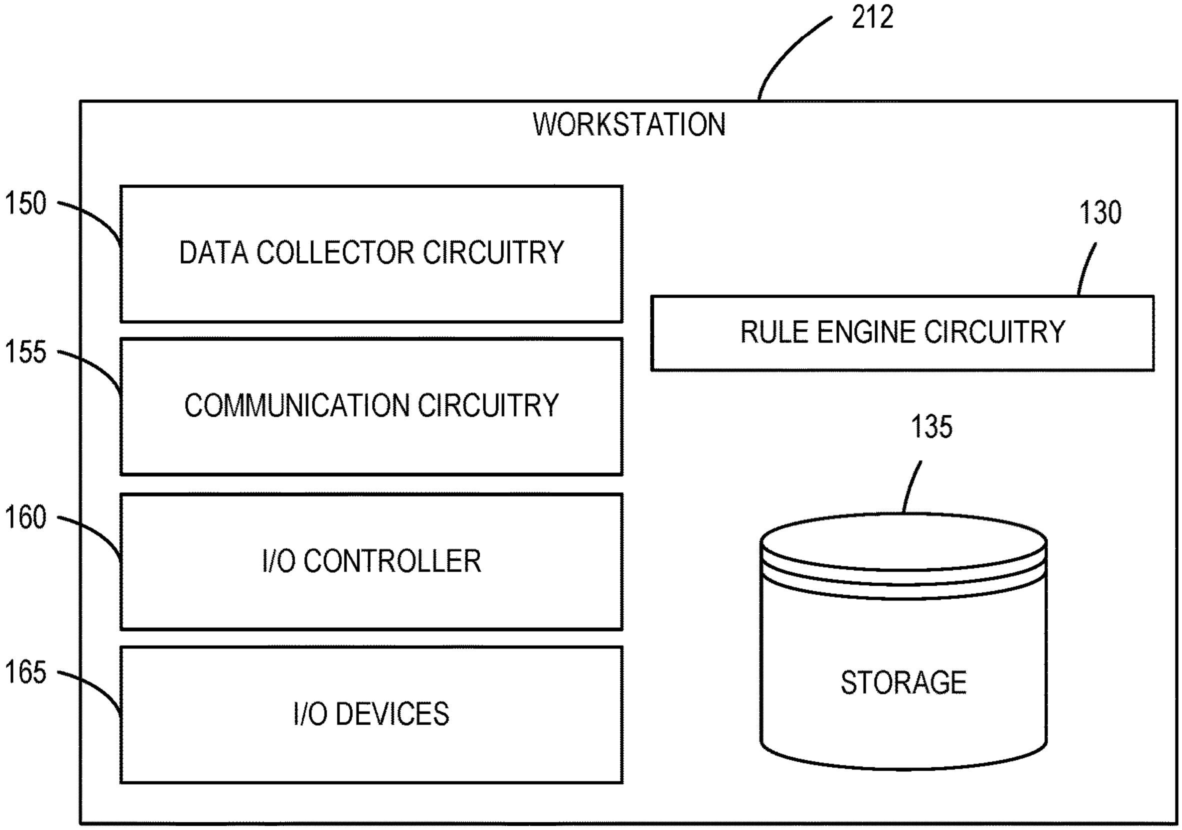
FIG. 2 is a schematic illustration of an example workstation of the process control system.

FIG. 2 is a block diagram of an workstation 212 of the process control system 100. The workstation 212 performs the same operations as the workstation 112 of FIG. 1. However, in this example, the rule engine circuitry 130 and storage 135 are located within the workstation 212. In this example, the rule engine circuitry 130 communicates with the data collector circuitry 150 through the communication circuitry 155 directly (e.g., without the need for an external communication medium such as a wired or wireless Ethernet connection). This example allows for the workstation 212 to access the rule engine circuitry 130 without the need for an external communication medium while still maintaining the benefits of a common or shared rule engine circuitry 130 for managing and executing rules.

The storage 135 of the illustrated example of FIG. 2, similar to the storage 135 of FIG. 1, stores one or more of rules, executables, results, etc., to be accessed by the rule engine circuitry 130. The storage 135 may be implemented by one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.). The storage 135 provides the ability for the rules to be transferred from workstation 212 to any other of the plurality of workstations 110.

Figure 3:
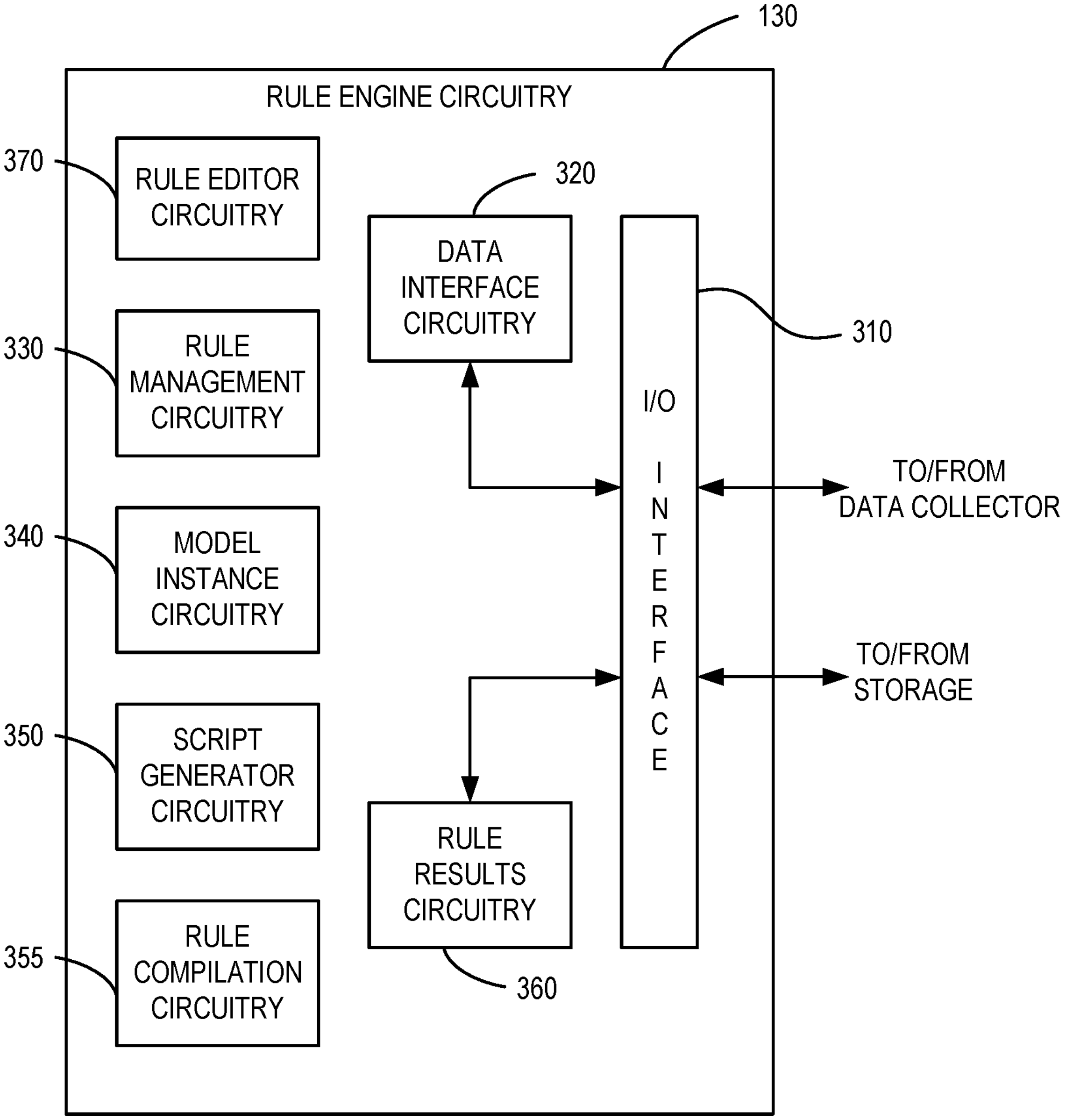
FIG. 3 is a block diagram representing an example implementation of the example rule engine circuitry of FIGS. 1 and/or 2.

FIG. 3 is a block diagram representing an example implementation of the rule engine circuitry 130 of FIGS. 1 and/or 2. The rule engine circuitry 130 of FIG. 3 may be instantiated (e.g., creating an instance of, bring into being for any length of time, materialize, implement, etc.) by processor circuitry such as a central processing unit executing instructions. Additionally, or alternatively, the rule engine circuitry 130 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The rule engine circuitry 130 of the illustrated example of FIG. 3 includes an I/O interface 310, data interface circuitry 320, rule management circuitry 330, model instance circuitry 340, script generator circuitry 350, rule compilation circuitry 355, rule results circuitry 360, and rule editor circuitry 370.

The data interface circuitry 320 of the illustrated example of FIG. 3 identifies a plurality of workstations 110, accesses property values from the workstation 112 stored within the data collector circuitry 150 through the I/O Interface 310, and records the property values. The data interface circuitry 320 interfaces with the data collector circuitry 150 through the I/O Interface 310. The I/O Interface 310 communicates with the communication circuitry 155 within the workstation 112 to send/retrieve data to/from the data collector circuitry 150. The data collector circuitry 150 sends/receives data to/from the I/O device 165 through the I/O controller 160 containing instructions to control the operation of the I/O device 165. In some examples, the data interface circuitry 320 is instantiated by processor circuitry executing data interface instructions and/or configured to perform operations such as those represented by the flowchart of FIG. 6.

In some examples, the process control system 100 includes means for identifying a plurality of workstations 110, accessing property values from the workstation 112 stored within data collector circuitry 150 through the I/O Interface 310, and record those property values. For example, the means for identifying a plurality of workstations 110, accessing property values from the workstation 112 stored within data collector circuitry 150 through the I/O Interface 310, and record the property values may be implemented by the data interface circuitry 320. In some examples, the data interface circuitry 320 may be instantiated by processor circuitry such as the processor circuitry 912 of FIG. 9. For instance, the data interface circuitry 320 may be instantiated by the example microprocessor 1000 of FIG. 10 executing machine executable instructions such as those implemented by at least blocks 610, 620, and 640 of FIG. 6. In some examples, the data interface circuitry 320 may be instantiated by hardware logic circuitry, which may be implemented by an ASIC, XPU, or FPGA circuitry 1100 of FIG. 11 structured to perform operations corresponding to the machine readable instructions. Additionally or alternatively, the data interface circuitry 320 may be instantiated by any other combination of hardware, software, and/or firmware. For example, the data interface circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The rule management circuitry 330 of the illustrated example of FIG. 3 manages a database of rules and executes the machine readable instructions contained in the rule(s). In some examples, the rule management circuitry 330 is instantiated by processor circuitry executing rule management instructions and/or configured to perform operations such as those represented by the flowcharts of FIGS. 5 and/or 6.

In some examples, the process control system 100 includes means for managing a database of rules and executing the machine readable instructions contained in the rule(s). For example, the means for managing a database of rules and executing the machine readable instructions contained in the rule(s) may be implemented by the rule management circuitry 330. In some examples, the rule management circuitry 330 may be instantiated by processor circuitry such as the processor circuitry 912 of FIG. 9. For instance, the rule management circuitry 330 may be instantiated by the microprocessor 1000 of FIG. 10 executing machine executable instructions such as those implemented by at least blocks 510 of FIGS. 5 and 650, 660, 670, 672, 674, and 690 of FIG. 6. In some examples, the rule management circuitry 330 may be instantiated by hardware logic circuitry, which may be implemented by an ASIC, XPU, or the FPGA circuitry 1100 of FIG. 11 structured to perform operations corresponding to the machine readable instructions. Additionally or alternatively, the rule management circuitry 330 may be instantiated by any other combination of hardware, software, and/or firmware. For example, the rule management circuitry 330 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The model instance circuitry 340 of the illustrated example of FIG. 3 creates a data model instance of an example workstation 112 based on the identification of the plurality of workstations 110. In some examples, the model instance circuitry 340 is instantiated by processor circuitry executing model instance instructions and/or configured to perform operations such as those represented by the flowchart of FIG. 6.

In some examples, the process control system 100 includes means for creating a data model instance of an workstation 112 based on the identification of the plurality of workstations 110. For example, the means for creating a data model instance of the workstation 112 based on the identification of the plurality of workstations 110 may be implemented by the model instance circuitry 340. In some examples, the model instance circuitry 340 may be instantiated by processor circuitry such as the processor circuitry 912 of FIG. 9. For instance, the model instance circuitry 340 may be instantiated by the microprocessor 1000 of FIG. 10 executing machine executable instructions such as those implemented by at least block 630 of FIG. 6. In some examples, the model instance circuitry 340 may be instantiated by hardware logic circuitry, which may be implemented by an ASIC, XPU, or the FPGA circuitry 1100 of FIG. 11 structured to perform operations corresponding to the machine readable instructions. Additionally or alternatively, the model instance circuitry 340 may be instantiated by any other combination of hardware, software, and/or firmware. For example, the model instance circuitry 340 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
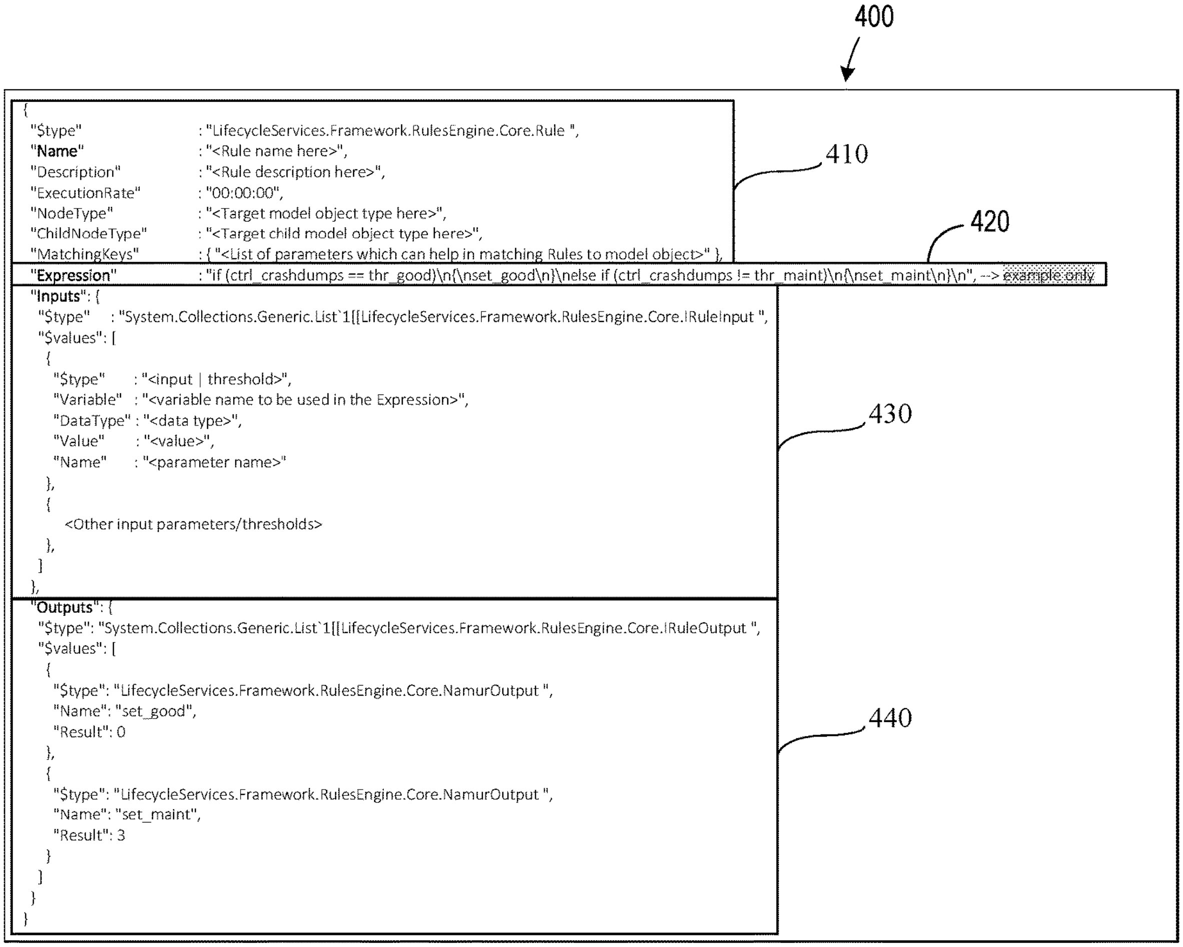
FIG. 4 is a representation of an example rule configuration file that may be used by the example rule engine circuitry of FIGS. 1, 2, and/or 3.

The script generator circuitry 350 of the illustrated example of FIG. 3 generates a machine readable instructions script from a rule configuration file 400 (FIG. 4). In some examples, the script generator circuitry 350 is instantiated by processor circuitry executing script generator instructions and/or configured to perform operations such as those represented by the flowchart of FIG. 5.

In some examples, the process control system 100 includes means for generating a machine readable instructions script from the rule configuration file 400. For example, the means for generating a machine readable instructions script from the rule configuration file 400 may be implemented by the script generator circuitry 350. In some examples, the script generator circuitry 350 may be instantiated by processor circuitry such as the processor circuitry 912 of FIG. 9. For instance, the script generator circuitry 350 may be instantiated by the microprocessor 1000 of FIG. 10 executing machine executable instructions such as those implemented by at least block 520 of FIG. 5. In some examples, the script generator circuitry 350 may be instantiated by hardware logic circuitry, which may be implemented by an ASIC, XPU, or the FPGA circuitry 1100 of FIG. 11 structured to perform operations corresponding to the machine readable instructions. Additionally or alternatively, the script generator circuitry 350 may be instantiated by any other combination of hardware, software, and/or firmware. For example, the script generator circuitry 350 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The rule compilation circuitry 355 of the illustrated example of FIG. 3 creates an executable package from a machine readable instructions file generated from the script generator circuitry 350. In some examples, the rule compilation circuitry 355 is instantiated by processor circuitry executing rule compilation instructions and/or configured to perform operations such as those represented by the flowchart of FIG. 5.

In some examples, the process control system 100 includes means for creating an executable package from a machine readable instructions file generated from the script generator circuitry 350. For example, the means for creating an executable package from a machine readable instructions file generated from the script generator circuitry 350 may be implemented by the rule compilation circuitry 355. In some examples, the rule compilation circuitry 355 may be instantiated by processor circuitry such as the processor circuitry 912 of FIG. 9. For instance, the rule compilation circuitry 355 may be instantiated by the microprocessor 1000 of FIG. 10 executing machine executable instructions such as those implemented by at least blocks 530 and 540 of FIG. 5. In some examples, the rule compilation circuitry 355 may be instantiated by hardware logic circuitry, which may be implemented by an ASIC, XPU, or the FPGA circuitry 1100 of FIG. 11 structured to perform operations corresponding to the machine readable instructions. Additionally or alternatively, the rule compilation circuitry 355 may be instantiated by any other combination of hardware, software, and/or firmware. For example, the rule compilation circuitry 355 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The rule results circuitry 360 of the illustrated example of FIG. 3 reports the result of a rule execution. The report of the rule execution may include pass or fail results, property values, and/or any other information collected via execution of the rule. In some examples, the rule results circuitry 360 communicates with an example graphical user interface (GUI) 700 (FIG. 7) or a web-based interface through the I/O Interface 310 to display the results of the rule execution. In some examples, the rule results circuitry 360 stores the results of the rule execution in an storage 135 through the I/O Interface 310 to maintain a history of rule execution results. In some examples, the rule results circuitry 360 is instantiated by processor circuitry executing rule results instructions and/or configured to perform operations such as those represented by the flowchart of FIG. 6.

In some examples, the process control system 100 includes means for reporting the result of a rule execution. For example, the means for reporting the result of a rule execution may be implemented by the rule results circuitry 360. In some examples, the rule results circuitry 360 may be instantiated by processor circuitry such as the processor circuitry 912 of FIG. 9. For instance, the rule results circuitry 360 may be instantiated by the microprocessor 1000 of FIG. 10 executing machine executable instructions such as those implemented by at least block 680 of FIG. 6. In some examples, the rule results circuitry 360 may be instantiated by hardware logic circuitry, which may be implemented by an ASIC, XPU, or the FPGA circuitry 1100 of FIG. 11 structured to perform operations corresponding to the machine readable instructions. Additionally or alternatively, the rule results circuitry 360 may be instantiated by any other combination of hardware, software, and/or firmware. For example, the rule results circuitry 360 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The rule editor circuitry 370 of the illustrated example of FIG. 3 applies edits to the rule parameter file 400. In some examples, the rule editor circuitry 370 is instantiated by processor circuitry executing rule editor instructions and/or configured to perform operations such as those represented by the flowchart of FIG. 8.

In some examples, the process control system 100 includes means for applying edits to the rule parameter file 400. For example, the means for applying edits to the rule parameter file 400 may be implemented by the rule editor circuitry 370. In some examples, the rule editor circuitry 370 may be instantiated by processor circuitry such as the processor circuitry 912 of FIG. 9. For instance, the rule editor circuitry 370 may be instantiated by the microprocessor 1000 of FIG. 10 executing machine executable instructions such as those implemented by at least blocks 810, 820, 822, 824, 826, 830, 832, 834, 840, 842, 844, and 850 of FIG. 8. In some examples, rule editor circuitry 370 may be instantiated by hardware logic circuitry, which may be implemented by an ASIC, XPU, or the FPGA circuitry 1100 of FIG. 11 structured to perform operations corresponding to the machine readable instructions. Additionally or alternatively, the rule editor circuitry 370 may be instantiated by any other combination of hardware, software, and/or firmware. For example, the rule editor circuitry 370 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the rule engine circuitry 130 is illustrated in FIG. 3, one or more of the elements, processes, and/or devices illustrated in FIG. 3 may be combined, divided, re-arranged, omitted, eliminated, and/or implemented in any other way. Further, the I/O interface 310, the data interface circuitry 320, the rule management circuitry 330, the model instance circuitry 340, the script generator circuitry 350, the rule compilation circuitry 355, the rule results circuitry 360, the rule editor circuitry 370 and/or, more generally, the rule engine circuitry 130 of FIG. 3, may be implemented by hardware alone or by hardware in combination with software and/or firmware. Thus, for example, any of the I/O interface 310, the data interface circuitry 320, the rule management circuitry 330, the model instance circuitry 340, the script generator circuitry 350, the rule compilation circuitry 355, the rule results circuitry 360, the rule editor circuitry 370 and/or, more generally, the rule engine circuitry 130, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the rule engine circuitry 130 of FIG. 3 may include one or more elements, processes, and/or devices in addition to, or instead of, those illustrated in FIG. 3, and/or may include more than one of any or all of the illustrated elements, processes and devices.

Figure 5:
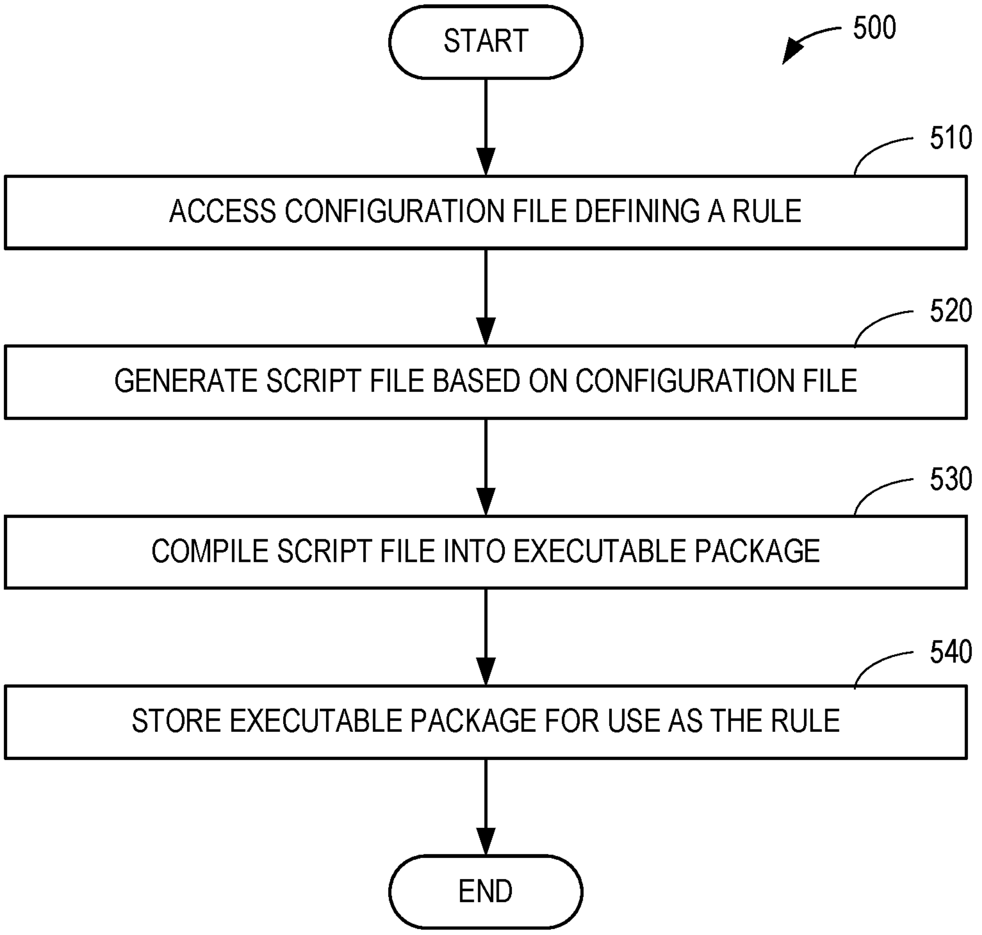
FIG. 5 is a flowchart representative of example machine readable instructions and/or example operations that may be executed and/or instantiated by example processor circuitry to implement the example script generator circuitry and rule compilation circuitry of FIG. 3.
Figure 6:
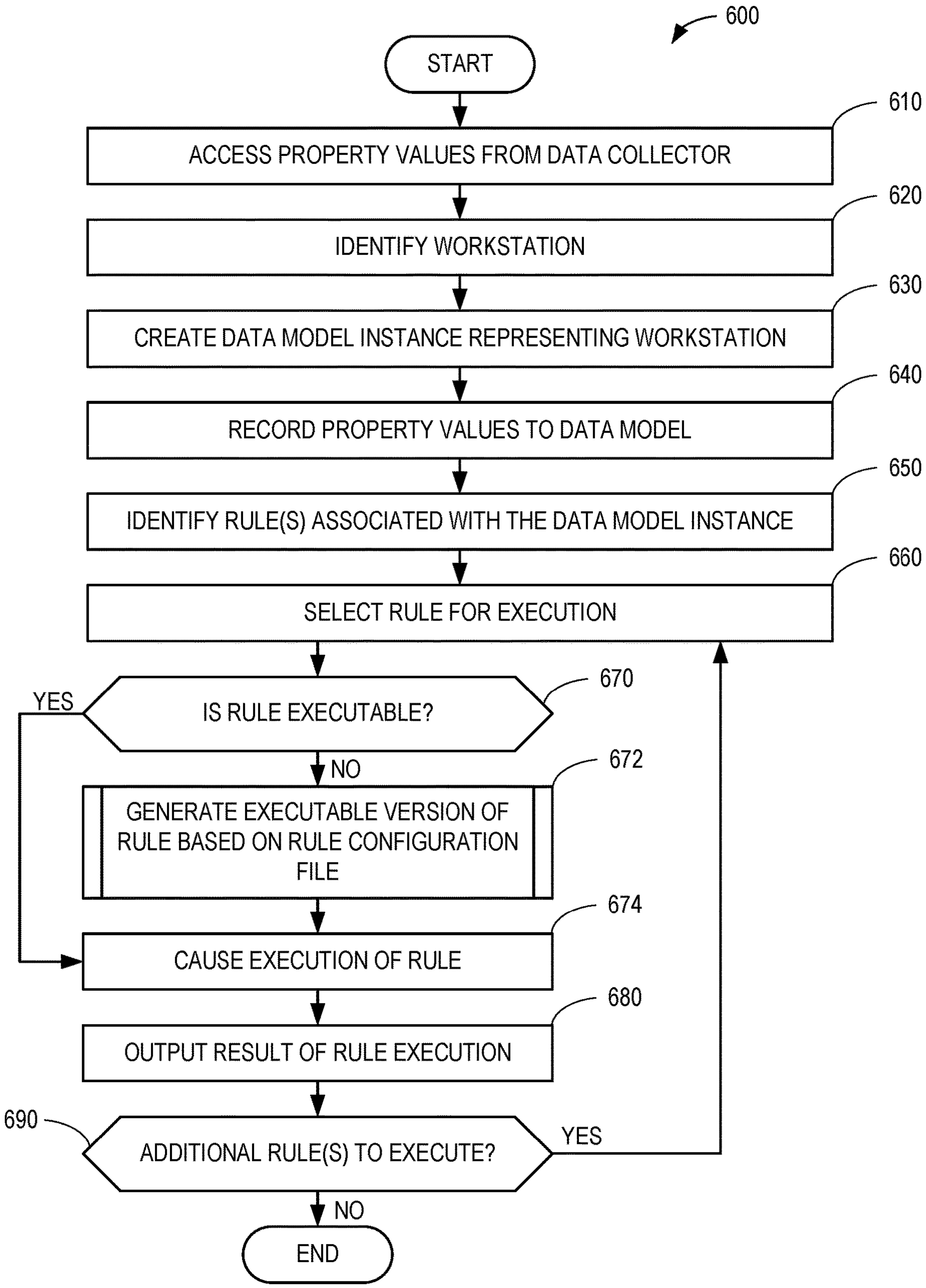
FIG. 6 is a flowchart representative of example machine readable instructions and/or example operations that may be executed and/or instantiated by example processor circuitry to implement the example rule engine circuitry of FIG. 3.

Flowcharts representative of example machine readable instructions, which may be executed to configure processor circuitry to implement the rule engine circuitry 130 of FIG. 3, are shown in FIGS. 5, 6, and/or 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 6, and/or 8, many other methods of implementing the rule engine circuitry 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 6, and/or 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a representation of an example rule configuration file 400 that may be used by the rule engine circuitry 130 of FIGS. 1, 2, and/or 3. The rule configuration file 400 includes example rule file execution properties 410, example rule execution commands 420, example inputs 430, and example outputs 440.

The rule file execution properties 410 of the rule configuration file 400 of the illustrated example of FIG. 4 includes information regarding the rule. In some examples, the rule file execution properties 410 may include the name of the rule, the target node and/or asset type in which the rule may execute on, a description of the rule, the execution rate of the rule, or any other combination of information that may be included to describe the properties of a rule.

The rule execution commands 420 of the rule configuration file 400 of the illustrated example of FIG. 4 include the core logic/machine readable instructions that the rule engine circuitry 130 executes to determine the success or failure of the rule. For example, the rule execution commands 420 may include instructions to instruct the rule engine circuitry 130 to query the CPU utilization of the workstation 112 and determine if the CPU utilization of the workstation 112 is above an example threshold of 85%. The rule execution commands 420 may then instruct the rule engine circuitry 130 to output a failure if the CPU utilization read is above the threshold of 85% or to output a pass if the CPU utilization read is below the threshold of 85%.

The inputs 430 of the rule configuration file 400 of FIG. 4 includes the parameters for which the rule engine circuitry 130 may request property values of from the data collector circuitry 150. In some examples, the inputs 430 may also include the threshold value(s) that the rule execution commands 420 uses to (e.g., compare to) check the property values received from the data collector circuitry 150. In some examples, the threshold value(s) that the rule execution commands 420 uses to check the property values received from the data collector circuitry 150 is/are stored in an external file.

The outputs 440 of the rule configuration file 400 of FIG. 4 includes the result of the rule execution commands 420. In some examples, the outputs 440 includes alert information to send to a web-based interface and/or the graphical user interface (GUI) 700 regarding the results of the rule execution commands 420. The outputs 440 are not limited to reporting only results of the rule execution commands 420. Any pertinent information regarding the execution of the rule may be included in the outputs 440. Examples of pertinent information regarding the execution of the rule may include, but are not limited to, time elapsed before a failure occurred, number of execution cycles failed, etc.

Any one of or combination of the rule file execution properties 410, the rule execution commands 420, the inputs 430, and/or the outputs 440 may be separated and/or combined in any number of ways that maintain the core functionality of the rule configuration file 400. In some examples, each of the rule file execution properties 410, the rule execution commands 420, the inputs 430, and the outputs 440 may be a separate file and the combination of each of these files may create the example rule configuration file 400. The rule configuration file 400 is not limited to a single file, nor is it limited to a single file type (e.g., text file, JavaScript Object Notation (JSON), etc.).

FIG. 5 is a flowchart representative of example machine readable instructions and/or example operations that may be executed and/or instantiated by processor circuitry to implement the script generator circuitry 350 and the rule compilation circuitry 355 of FIG. 3. The script generation and rule compilation process 500 of FIG. 5 begins at block 510, at which the rule management circuitry 330 accesses the rule configuration file 400. In some examples, the rule configuration file 400 may be located on the rule engine circuitry host 120 stored within the storage 135 and may be retrieved by the rule engine circuitry 130. In some examples, the rule configuration file 400 may be located on the workstation 212 stored within the storage 135 and may be retrieved by the rule engine circuitry 130. In some examples, the rule configuration file 400 may be located in a remote location (e.g., a remote server) and may be retrieved by the rule engine circuitry 130 via the network 115.

The script generator circuitry 350 generates a machine readable instructions script from the rule configuration file 400. (Block 520). An example approach to generating the machine readable instructions script is to utilize a Roslyn .NET compiler platform for dynamic script generation. In some examples, the script generator circuitry 350 (e.g., the Roslyn .NET compiler platform) reads a JavaScript Object Notation (JSON) rule configuration file 400 and generates a machine readable instructions script. In some examples, the machine readable instructions script is a C #file. However any other programming language and/or programming syntax may additionally or alternatively be used. In some examples, the generation of the machine readable instructions script is known as refactoring, in which the JSON rule configuration file 400 is refactored into the machine readable instructions script.

The rule compilation circuitry 355 compiles the machine readable instructions script generated from the rule configuration file 400 into an executable package. (Block 530). The executable package may be a single executable program file (e.g., a .exe file) or any combination of executable package files necessary to instruct a machine to execute the rule execution commands 420 in the rule configuration file 400. An example approach to compiling a machine readable instructions script into an executable package is to utilize a Roslyn .NET compiler platform to compile the generated machine readable instructions script into an executable package.

In some examples, the rule compilation circuitry 355 stores/saves the executable package for the rule engine circuitry 130 to execute the instructions stored therein. (Block 540). The executable package may be stored on the rule engine circuitry host 120 stored within the storage 135 and may be retrieved by the rule engine circuitry 130 for execution. In some examples, the executable package may be stored on the workstation 212 within the storage 135 and may be retrieved by the rule engine circuitry 130 for execution. In some examples, the rule management circuitry 330 may also store the executable package for the rule engine circuitry 130 to execute the instructions stored therein.

FIG. 6 is a flowchart representative of example machine readable instructions and/or example operations that may be executed and/or instantiated by processor circuitry to implement the rule engine circuitry 130 of FIG. 3. The rule engine execution process 600 of FIG. 6 begins at block 610, at which the data interface circuitry 320 accesses property values stored within the data collector circuitry 150 through the I/O Interface 310. In some examples, the data interface circuitry 320 may access property values such as CPU utilization, storage utilization, temperature readings, or any other information related to workstation system health and performance from the data collector circuitry 150. In some examples, the data interface circuitry 320 may access property values defining the data model instance (e.g., Internet Protocol (IP) Address, workstation identification information, etc.).

In some examples, the data interface circuitry 320 identifies the workstation 112 on which the example rule configuration file 400 may be executed. (Block 620). In some examples, the rule management circuitry 330 may also identify the workstation 112 on which the example rule configuration file 400 may be executed.

The model instance circuitry 340 creates an instance (e.g., a virtual representation of properties) of the workstation 112 (e.g., a data model instance) based on the identification of the workstation 112 from block 620. (Block 630). The creation of an instance allows the rule management circuitry 330 to execute rules, either in parallel or in series.

The data interface circuitry 320 then records property values collected from the data collector circuitry 150 through the I/O Interface 310 to each data model instance created by the model instance circuitry 340. (Block 640). As described above, in some examples, the property values include parameters such as CPU utilization, storage utilization, temperature readings, or any other information related to workstation system operation, health, and/or performance. In some examples, the property values may include parameters defining the data model instance (e.g., Internet Protocol (IP) Address, workstation identification information, etc.).

The rule management circuitry 330 identifies the rule(s) associated with each data model instance created by the model instance circuitry 340. (Block 650). In some examples, the rule management circuitry 330 retrieves the rule(s) stored on the rule engine circuitry host 120 within the storage 135. In some examples, the rule management circuitry 330 may also retrieve the rule(s) stored on the workstation 212 within the storage 135.

The rule management circuitry 330 then selects the rule(s) to execute based on the identification of the rule(s) from block 650. (Block 660). As described above, the rule management circuitry 330 may execute rules, either in parallel or in series.

The rule management circuitry 330 then determines if an executable package exists for the rule. (Block 670). For example, the rule management circuitry 330 may determine if an executable package exists by querying the storage 135 for one or more identifiers for the rule (e.g., a file name, a file extension, a file location, a file content, etc.).

When the rule management circuitry 330 determines that an executable package for the rule does not exist (e.g., block 670 returns a result of NO), the rule management circuitry 330 generates an executable package for the rule. (Block 672). In some examples, the example instructions of block 672 are implemented according to the script generation and rule compilation process 500 of FIG. 5.

When the executable package is created by the script generation and rule compilation process 500 from block 672 or when the rule management circuitry 330 determines that an executable package for the rule already exists (e.g., block 670 return a result of YES), the rule management circuitry 330 then causes the execution of the rule. (Block 674).

When the rule management circuitry 330 completes execution of the rule, the rule results circuitry 360 communicates the results of the rule execution commands 420. (Block 680). The results may include a pass or fail indication, property values, or any other information collected during the execution of the rule. In some examples, the rule results circuitry 360 may report the results to a web-based interface or the graphical user interface (GUI) 700 through the I/O Interface 310.

In some examples, the rule results circuitry 360 may store the results of the rule execution commands 420 on the storage 135, or any form of internal or external storage medium, to maintain a history of the results by communicating with the storage 135 through the I/O Interface 310. The storage of the results allows for the analysis of historical trend data that may be pertinent to system health and performance analysis.

The rule management circuitry 330 then determines if there are any more rules that need to be executed. (Block 690). In some examples, the rule management circuitry 330 may determine if there are any more rules that need to be run by accessing the list of rule(s) identified by block 650. When the rule management circuitry 330 determines that there are additional rules that need to be executed (e.g., block 690 returns a result of YES), the rule management circuitry 330 returns to block 660 to select the next rule for execution. The rule engine execution process 600 of blocks 660 through 690 is repeated until the rule management circuitry 330 determines that there are no additional rules to execute.

Figure 7:
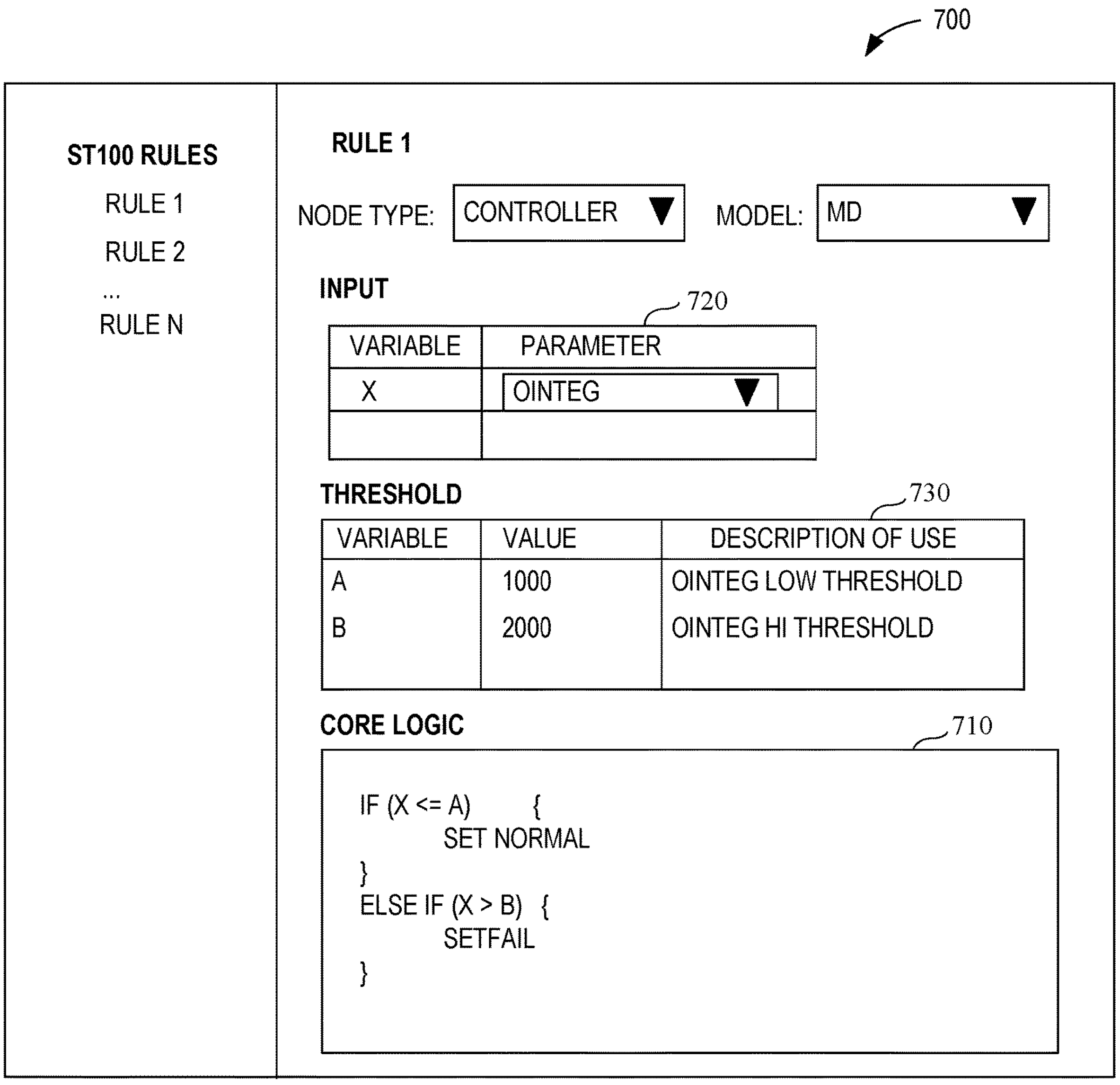
FIG. 7 is a representation of an example graphical user interface that may be displayed by the example rule editor circuitry of FIG. 3.

FIG. 7 is a representation of the graphical user interface (GUI) 700 that may be displayed by the rule editor circuitry 370 of FIG. 3. The GUI 700 includes an example core logic field 710, an example editable parameters field 720, and an example editable thresholds field 730.

The core logic field 710 of the GUI 700 of FIG. 7 displays the rule execution commands 420 that the rule engine circuitry 130 executes. In some examples, the core logic field 710 is not editable. In this example, prohibiting the editing of the core logic field 710 ensures that the rule does not need to be recompiled and revalidated, saving maintenance costs and reducing the probability of errors. Further, in this example, the rule, when created, includes a list of possible variations to the core logic field 710 that may be executed by the rule engine circuitry 130. In some examples, the core logic field 710 may be editable, allowing for modifications to the rule execution commands 420 that the rule engine circuitry 130 executes.

The editable parameters field 720 of the GUI 700 of FIG. 7 allows customization of the inputs 430 and outputs 440 of the rule configuration file 400. In some examples, the editable parameters field 720 includes an array of parameters available within the workstation 112 that may be analyzed by the rule engine circuitry 130 based on the rule execution commands 420. For example, when the rule engine circuitry 130 selects to run a rule executing commands to check the health of the CPU of the workstation 112, the array of parameters in the editable parameters field 720 may include only a list of parameters related to the health of the CPU. In some examples, the parameters available in the editable parameters field 720 may include a comprehensive list of all parameters available within the process control system 100 and/or the workstation 112.

The editable thresholds field 730 of the GUI 700 of FIG. 7 allows customization of the thresholds the rule engine circuitry 130 may compare the inputs 430 against to determine the health of the system. In some examples, the thresholds may be included in the inputs 430 of the rule configuration file 400, the configuration file 400 being read by the GUI 700 to populate the editable thresholds field 730. In some examples, the thresholds may be in a separate file and read by the GUI 700 to populate the editable thresholds field 730.

Figure 8:
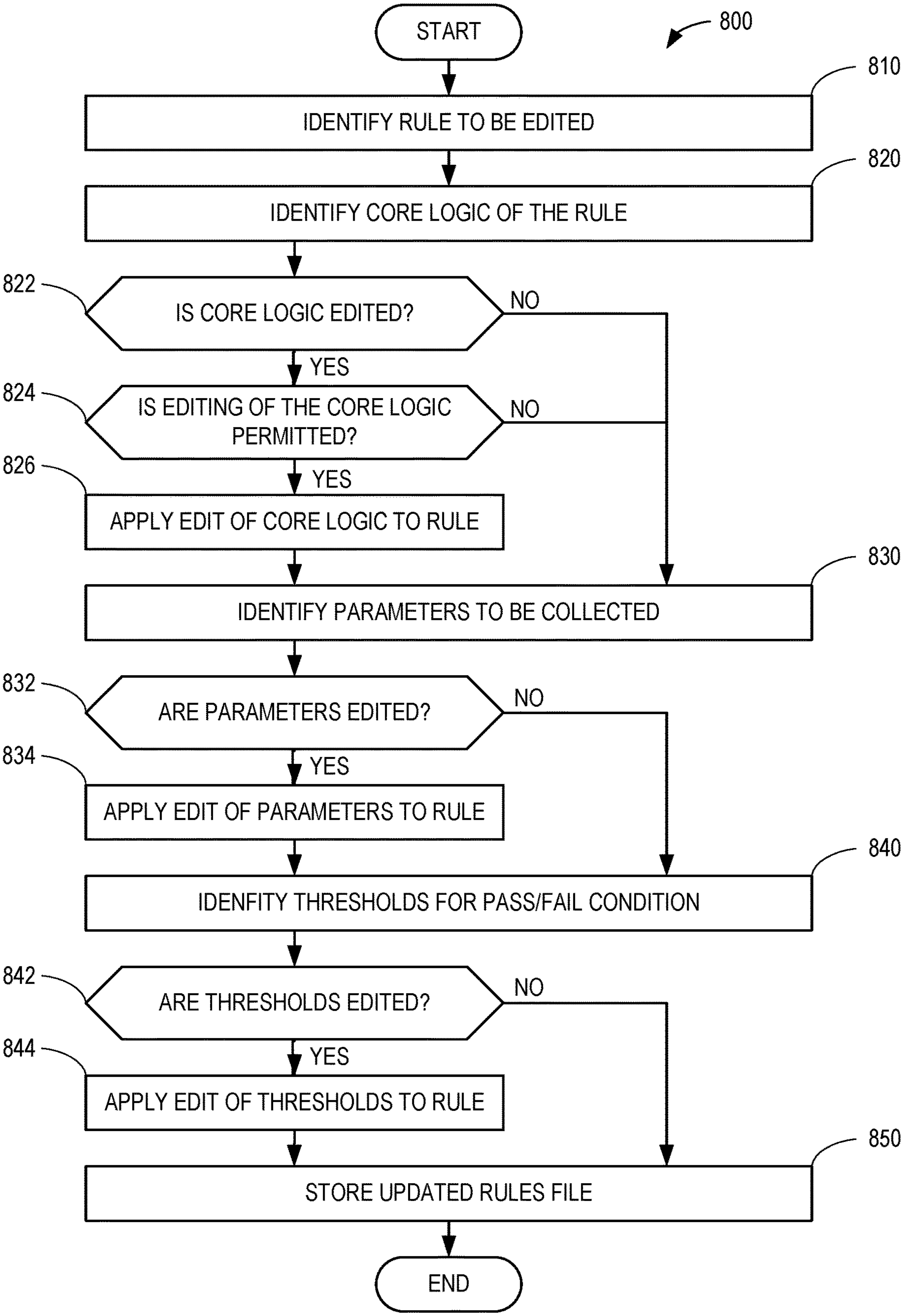
FIG. 8 is a flowchart representative of example machine readable instructions and/or example operations that may be executed and/or instantiated by example processor circuitry to implement the example rule editor circuitry of FIG. 3.

FIG. 8 is a flowchart representative of example machine readable instructions and/or example operations that may be executed and/or instantiated by processor circuitry to implement the rule editor circuitry 370 of FIG. 3. The rule editor process 800 of FIG. 8 begins at block 810, at which the rule editor circuitry 370 identifies the rule to edit. In some examples, the rule may be stored within a rules dictionary, which contains a list of the rules available within the system that the rule editor circuitry 370 may retrieve. In some examples, the rule may be stored in an individual file on the workstation 112 within the storage 135. The rules may be stored in any one or more of a comma-separated values (CSV) file, text file, JSON file, or any other file extension.

The rule editor circuitry 370 then identifies the rule execution commands 420 (e.g., core logic). (Block 820). The rule execution commands 420 include the instructions that the rule engine circuitry 130 executes. In some examples, the rule editor circuitry 370 may identify the rule execution commands 420 by analyzing the format of the rule parameter file 400 and extracting information identifying the rule execution commands 420. One identification method may include searching for patterns such as a string phrase and/or a sub-classification of file identification information (e.g., breaking the rule configuration file 400 into its individual components such as the rule execution commands 420, the inputs 430, the outputs 440, etc.).

The rule editor circuitry 370 then determines if the rule execution commands 420 have been edited. (Block 822). The rule editor circuitry 370 may determine if the rule execution commands 420 have been edited, for example, by determining if the rule configuration file 400 has been modified, either through file save information, version control history, or any other way of determining whether a file or a specific portion of a file has been modified.

When the rule editor circuitry 370 determines that the rule execution commands 420 have been edited (e.g., block 822 returns a result of YES), the rule editor circuitry 370 then determines if editing of the rule execution commands 420 is permitted (e.g., by accessing the administrative rules associated with the rule configuration file 400). (Block 824). In some examples, the administrative rules for the rule configuration file 400 may prohibit the editing of the rule execution commands 420. In prohibiting the editing of the rule execution commands 420, the validation process for the rule can be reduced or even eliminated because recompilation is not required, which reduces maintenance cost. In some examples, the rule execution commands 420 can be edited to change the rule being performed and/or to optimize the execution of the rule.

When the rule editor circuitry 370 determines that editing of the rule execution commands 420 is permitted (e.g., block 824 returns a result of YES), then the rule editor circuitry 370 applies the changes of the rule execution commands 420 to the rule configuration file 400 and saves the resulting rule configuration file 400. (Block 826).

When the rule editor circuitry 370 determines that either the rule execution commands 420 have not been edited (e.g., block 822 returns a result of NO), the editing of the rule execution commands 420 is not permitted (e.g., block 824 returns a result of NO), or the rule editor 370 has applied the changes of the rule execution commands 420 to the rule configuration file 400, the rule editor circuitry 370 then identifies the inputs 430 and/or the outputs 430 (e.g., parameters) to be collected during execution of the rule. (Block 830). In some examples, the rule editor circuitry 370 may identify the inputs 430 and/or the outputs 430 by analyzing the format of the rule parameter file 400 and extracting information identifying the inputs 430 and/or the outputs 440. One identification method may include searching for patterns such as a string phrase and/or a sub-classification of file identification information (e.g., breaking the rule configuration file 400 into its individual components such as rule execution commands 420, the inputs 430, the outputs 440, etc.).

The rule editor circuitry 370 then determines if the inputs 430 and/or the outputs 430 have been edited. (Block 832). The rule editor circuitry 370 may determine if the inputs 430 and/or the outputs 430 have been edited, for example, by determining if the rule configuration file 400 has been modified, either through file save information, version control history, or any other way of determining whether a file or a specific portion of a file has been modified.

When the rule editor circuitry 370 determines that the inputs 430 and/or the outputs 430 have been edited (e.g., block 832 returns a result of YES), then the rule editor circuitry 370 applies the changes of the inputs 430 and/or the outputs 440 to the rule configuration file 400 and saves the resulting rule configuration file 400. (Block 834).

When the rule editor circuitry 370 determines that either the inputs 430 and/or the outputs 430 have not been edited (e.g., block 832 returns a result of NO) or the rule editor circuitry 370 has applied the changes of the inputs 430 and/or the outputs 430 to the rule configuration file 400, the rule editor circuitry 370 then identifies the thresholds the inputs 430 may be evaluated against during execution of the rule. (Block 840). In some examples, the rule editor circuitry 370 may identify the thresholds by analyzing the format of the rule parameter file 400 and extracting information identifying the thresholds from the inputs 430. One identification method may include searching for patterns such as a string phrase and/or a sub-classification of file identification information (e.g., breaking the rule configuration file 400 into its individual components such as rule execution commands 420, the inputs 430, the outputs 440, etc.).

In this example, the thresholds are included within the inputs 430 of the rule parameter file 400. In some examples, the thresholds may be stored in a thresholds file separate from the rule configuration file 400. The thresholds file may be in the form of, but is not limited to, a database (db) file, a JSON file, and/or a CSV file. Keeping the thresholds file separate from the rule configuration file 400 may greatly reduce maintenance cost as well as validation costs for the rule engine circuitry 130.

The rule editor circuitry 370 then determines if the thresholds have been edited. (Block 842). In some examples, the rule editor circuitry 370 may determine if the thresholds have been edited by determining if the rule configuration file 400 has been modified, either through file save information, version control history, or any other way of determining whether a file or a specific portion of a file has been modified. In some examples, the rule editor circuitry 370 may read the thresholds file that is separate from the rule configuration file 400 and determine if any of the thresholds have been edited.

When the rule editor circuitry 370 determines that the thresholds have been edited (e.g., block 842 returns a result of YES), then the rule editor circuitry 370 applies the changes of the thresholds to the inputs 430 of the rule configuration file 400 and saves the resulting rule configuration file 400. (Block 844). In some examples, the rule editor circuitry 370 may instead apply the changes of the thresholds to the thresholds file separate from the rule configuration file 400.

When the rule editor circuitry 370 determines that either the thresholds have not been edited (e.g., block 842 returns a result of NO) or the rule editor circuitry 370 has applied the changes of the thresholds to the file containing the threshold information (either the rule configuration file 400 or the thresholds file), the rule editor circuitry 370 saves the final updated rule configuration file 400. (Block 850). In some examples the rule configuration file 400 may be saved on the rule engine circuitry host 120 stored within the storage 135. In some examples, the rule configuration file 400 may be saved on the workstation 212 stored within the storage 135. In some examples, the rule configuration file 400 may alternatively be saved to a remote location (e.g., a remote server) over network 115.

In some examples, the rule editor circuitry 370 allows for the creation and modification of a rule through the GUI 700. In some examples, the rule editor circuitry 370 allows for the import of an external file containing rule parameter information to be applied to a rule or to batch create a plurality of rule configuration files 400.

Figure 9:
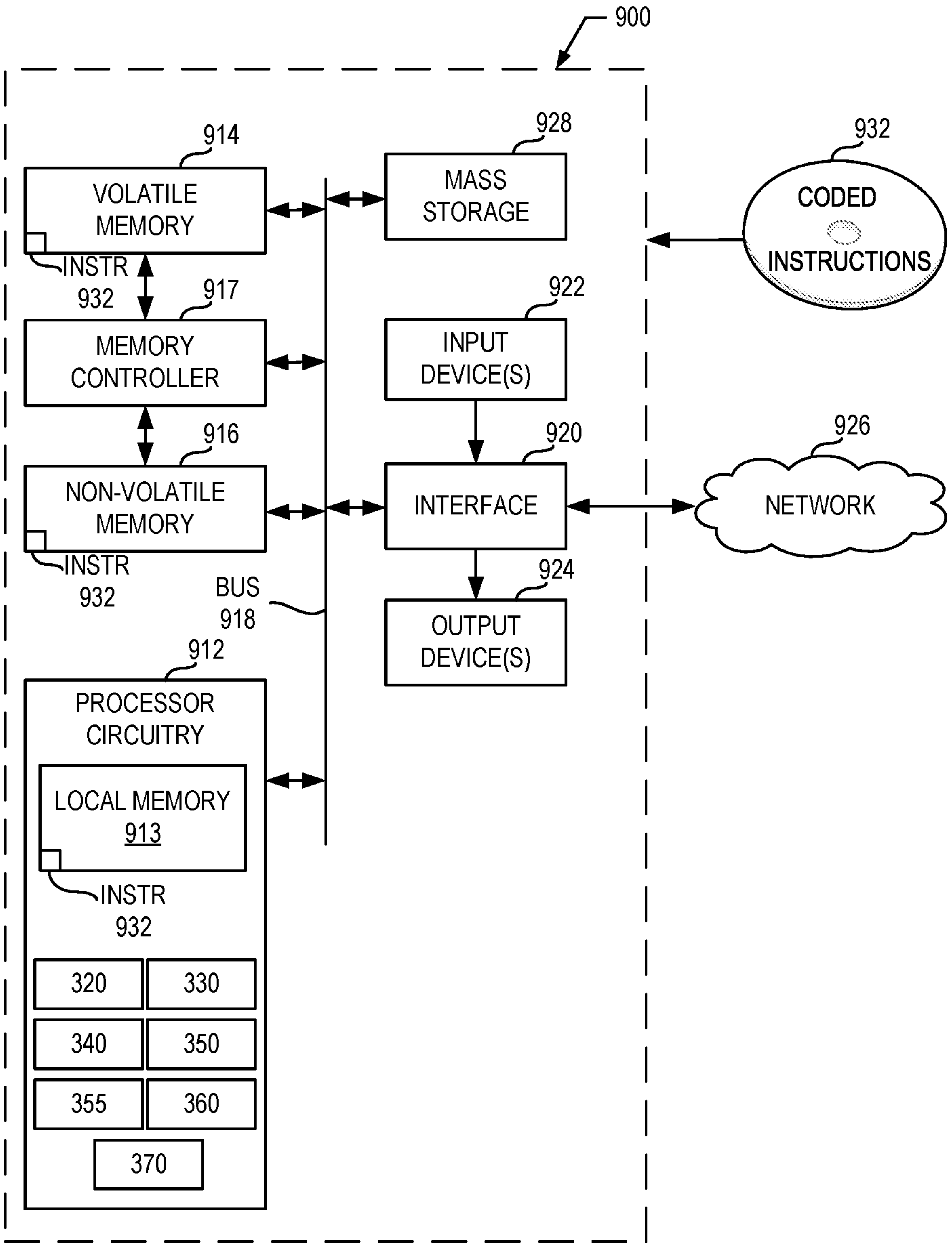
FIG. 9 is a block diagram of an example processing platform including processor circuitry structured to execute the example machine readable instructions and/or the example operations of FIGS. 5, 6, and/or 8 to implement the example rule engine circuitry of FIG. 3.

FIG. 9 is a block diagram of an example processor platform 900 structured to execute and/or instantiate the machine readable instructions and/or the operations of FIGS. 5, 6, and/or 8 to implement the rule engine circuitry 130 of FIG. 3. The processor platform 900 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the data interface circuitry 320, rule management circuitry 330, model instance circuitry 340, script generator circuitry 350, rule compilation circuitry 355, rule results circuitry 360, and rule editor circuitry 370.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, a keyboard, a button, a mouse, a touchscreen, a track-pad, a trackball, and/or an isopoint device.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 5, 6, and/or 8, may be stored in the mass storage device 928, in the volatile memory 914, in the non-volatile memory 916, and/or on a removable non-transitory computer readable storage medium such as a CD or DVD.

Figure 10:
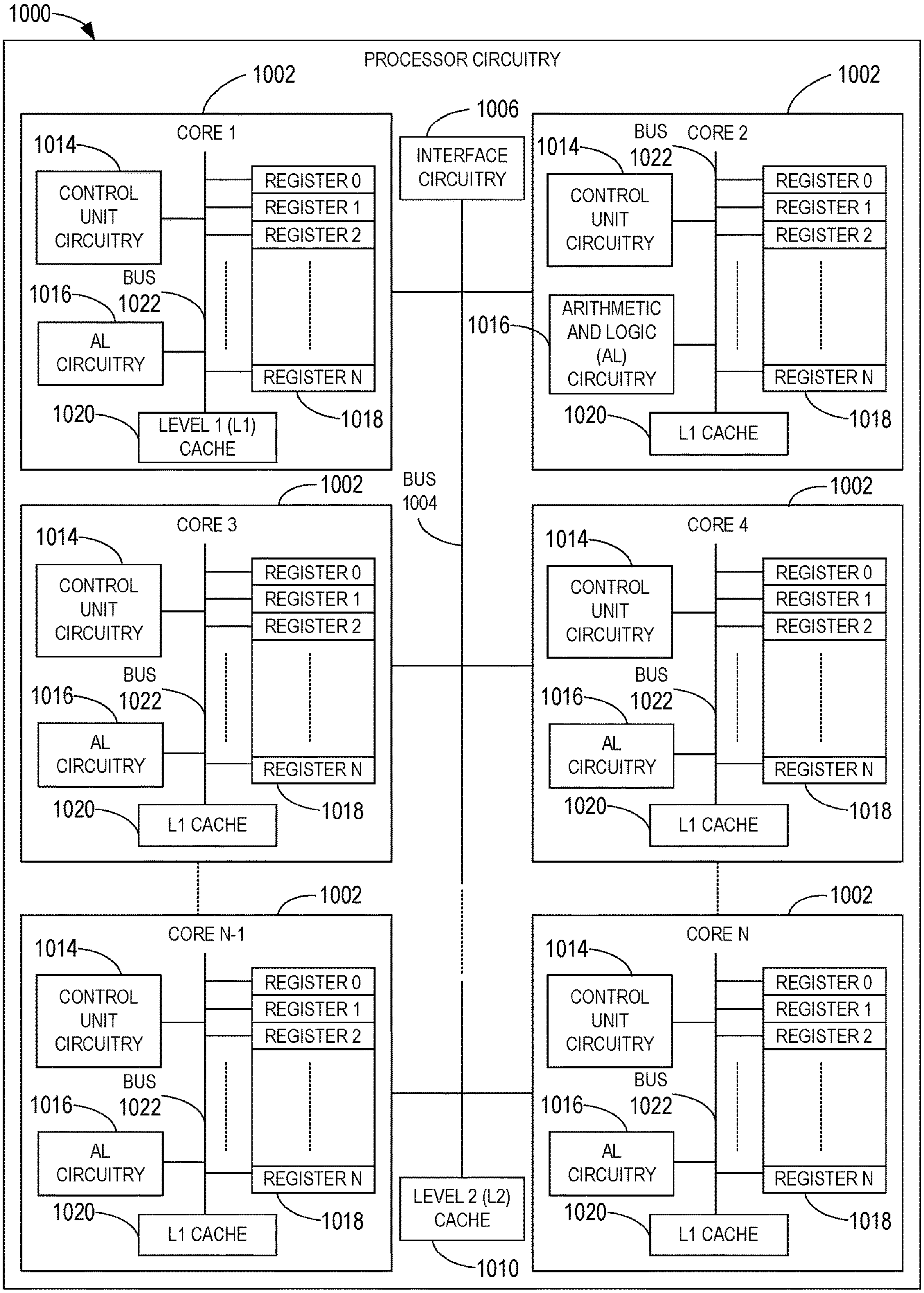
FIG. 10 is a block diagram of an example implementation of the processor circuitry of FIG. 9.

FIG. 10 is a block diagram of an example implementation of the processor circuitry 912 of FIG. 4. In this example, the processor circuitry 912 of FIG. 4 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 5, 6, and/or 8 to effectively instantiate the rule engine circuitry 130 of FIG. 3 as logic circuits to perform the operations corresponding to those machine readable instructions. In some such examples, the rule engine circuitry 130 of FIG. 3 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 5, 6, and/or 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
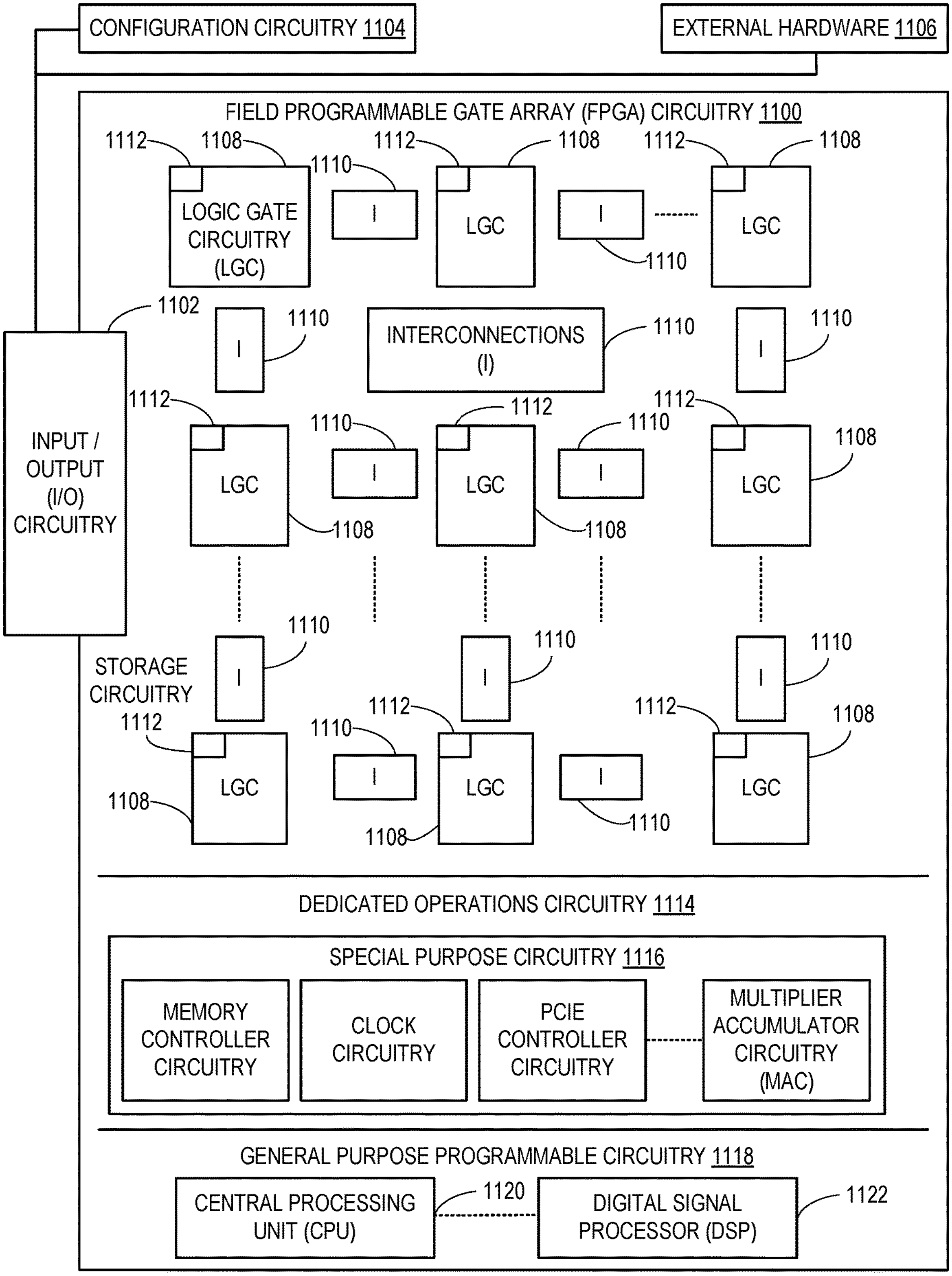
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 5, 6, and/or 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 5, 6, and/or 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 5, 6, and/or 8. As such, the FPGA circuitry 1100 may be structured to effectively instantiate some or all of the machine readable instructions of the flowcharts of FIGS. 5, 6, and/or 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 5, 6, and/or 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 5, 6, and/or 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modem FPGA circuitry may include an onboard CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 5, 6, and/or 8 may be executed by one or more of the cores 1002 of FIG. 10, a second portion of the machine readable instructions represented by the FIGS. 5, 6, and/or 8 may be executed by the FPGA circuitry 1100 of FIG. 11, and/or a third portion of the machine readable instructions represented by the flowcharts of FIGS. 5, 6, and/or 8 may be executed by an ASIC. It should be understood that some or all of the rule engine circuitry 130 of FIG. 3 may, thus, be instantiated at the same or different times. Some or all of the circuitry may be instantiated, for example, in one or more threads executing concurrently and/or in series. Moreover, in some examples, some or all of the rule engine circuitry 130 of FIG. 3 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
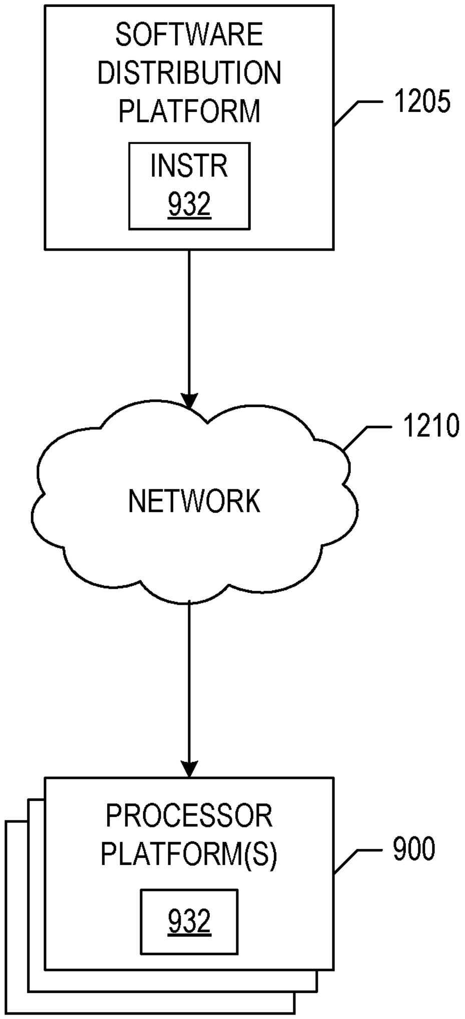
FIG. 12 is a block diagram of an example software distribution platform (e.g., one or more servers) to distribute software (e.g., software corresponding to the example machine readable instructions of FIGS. 5, 6, and/or 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the machine readable instructions 932 of FIG. 9 to hardware devices owned and/or operated by third parties is illustrated in FIG. 12. The software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the machine readable instructions 500, 600, and/or 800 of FIGS. 5, 6, and/or 8, as described above. The one or more servers of the software distribution platform 1205 are in communication with an example network 1210, which may correspond to any one or more of the Internet and/or any of the networks 926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the machine readable instructions 500, 600, and/or 800 of FIGS. 5, 6, and/or 8, may be downloaded to the processor platform 900, which is to execute the machine readable instructions 932 to implement the rule engine circuitry 130. In some examples, one or more servers of the software distribution platform 1205 periodically offer, transmit, and/or force updates to the software (e.g., the machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that implements one or more checks and a checks executor that is used by one or more workstations to reduce maintenance costs associated with system health and performance validation checks Disclosed systems, methods, apparatus, and articles of manufacture improve the efficiency of using a computing device by implementing the rule engine circuitry 130 that can be independent of any individual workstation, which enables common or shared usage of the rule engine circuitry 130 on any of the plurality of workstations 110 across the process control system 100. Such an implementation allows for reduced maintenance costs and reduces the risk of errors due to the validation of system health and performance checks. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to implement one or more checks and a checks executor that is used by one or more workstations to reduce maintenance costs associated with system health and performance validation checks is disclosed herein. Further examples and combinations thereof include the following:

Example 1 includes an apparatus for executing a rule comprising at least one memory, machine readable instructions, and processor circuitry to at least one of instantiate or execute the machine readable instructions to access a property value from a data collector, the property value including an operational value of a workstation within a process control system, create a data model instance representing the workstation, apply the property value to the data model instance, identify a rule associated with the data model instance, cause execution of an executable package associated with the rule using the data model instance, and record a result of the execution of the executable package.

Example 2 includes the apparatus of example 1, wherein the processor circuitry further at least one of instantiates or executes the machine readable instructions to access a rule configuration file defining a rule execution instruction, generate a computer readable script based on the rule configuration file, compile the computer readable script into the executable package, and store the executable package to a storage device.

Example 3 includes the apparatus of example 1, wherein the processor circuitry further at least one of instantiates or executes the machine readable instructions to apply an update to at least one of core logic of the rule, a parameter to be utilized during execution of the rule, or a threshold to be utilized during execution of the rule, and store a rule configuration file.

Example 4 includes the apparatus of example 3, wherein the threshold is in a file separate from the rule.

Example 5 includes the apparatus of example 1, wherein the data collector is to receive instructions to retrieve the property value via a network connection.

Example 6 includes the apparatus of example 1, wherein the result of the rule execution is presented using a web-based interface.

Example 7 includes the apparatus of example 1, wherein the result of the rule execution is stored to a storage device.

Example 8 includes the apparatus of example 1, wherein a remote device is to instruct the processor circuitry to at least one of instantiate or execute the machine readable instructions.

Example 9 includes a non-transitory machine readable storage medium comprising instructions that, when executed, cause processor circuitry to at least access a property value from a data collector, the property value including an operational value of a workstation within a process control system, create a data model instance representing the workstation, apply the property value to the data model instance, identify a rule associated with the data model instance, cause execution of an executable package associated with the rule using the data model instance, and record a result of the execution of the executable package.

Example 10 includes the non-transitory machine readable storage medium of example 9, wherein the instructions, when executed, cause the processor circuitry to at least access a rule configuration file defining a rule execution instruction, generate a computer readable script based on the rule configuration file, compile the computer readable script into the executable package, and store the executable package to a storage device.

Example 11 includes the non-transitory machine readable storage medium of example 9, wherein the instructions, when executed, cause the processor circuitry to at least apply an update to at least one of core logic of the rule, a parameter to be utilized during execution of the rule, or a threshold to be utilized during execution of the rule, and store a rule configuration file.

Example 12 includes the non-transitory machine readable storage medium of example 11, wherein the threshold is edited in a file separate from the rule.

Example 13 includes the non-transitory machine readable storage medium of example 9, wherein the instructions, when executed, cause the processor circuitry to at receive instructions to retrieve the property value via a network connection.

Example 14 includes the non-transitory machine readable storage medium of example 9, wherein the instructions, when executed, display the result of the rule execution via a graphical user interface.

Example 15 includes a method for executing a rule, the method comprising accessing a property value from a data collector, the property value including an operational value of a workstation within a process control system, creating a data model instance representing the workstation, applying the property value to the data model instance, identifying a rule associated with the data model instance, causing execution of an executable package associated with the rule using the data model instance, and recording a result of the execution of the executable package.

Example 16 includes the method of example 15, further including accessing a rule configuration file defining a rule execution instruction, generating a computer readable script based on the rule configuration file, compiling the computer readable script into the executable package, and storing the executable package to a storage device.

Example 17 includes the method of example 15, further including applying an update to at least one of core logic of the rule, a parameter to be utilized during execution of the rule, or a threshold to be utilized during execution of the rule, and storing a rule configuration file.

Example 18 includes the method of example 17, wherein the thresholds are edited in a file separate from the rule.

Example 19 includes the method of example 15, wherein the data collector receives instructions to retrieve the property value via a network connection.

Example 20 includes the method of example 15, wherein the result of the rule execution is displayed to at least one of a web-based interface or a graphical user interface.

Example 21 includes the method of example 15, wherein the result of the rule execution is stored to a storage device.

Example 22 includes the method of example 21, further including querying the stored result, and analyzing the result to identify trend information.

Example 23 includes an apparatus for executing a rule comprising means for accessing a property value from a data collector, the property value including an operational value of a workstation within a process control system, means for creating a data model instance representing the workstation, means for applying the property value to the data model instance, means for identifying a rule associated with the data model instance, means for causing execution of an executable package associated with a rule using the data model instance, and means for recording a result of the execution of the executable package.

Example 24 includes the apparatus of example 23, wherein the means for accessing is a first means for accessing, and further including second means for accessing a rule configuration file defining a rule execution instruction, means for generating a computer readable script based on the rule configuration file, means for compiling the computer readable script into the executable package, and means for storing the executable package to a storage device.

Example 25 includes the apparatus of example 23, wherein the means for applying is a first means for applying, and further including second means for applying an update to at least one of core logic of the rule, a parameter to be utilized during execution of the rule, or a threshold to be utilized during execution of the rule, and means for storing a rule configuration file.

Example 26 includes the apparatus of example 23, further including means for receiving instructions to retrieve the property values via a network connection.

Example 27 includes the apparatus of example 23, further including means for reporting the result of the rule execution to a graphical user interface.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for executing a rule comprising:
- at least one memory;
- machine readable instructions; and
- processor circuitry to at least one of instantiate or execute the machine readable instructions to:
  - access a property value from a data collector, the property value including an operational value of a first workstation within a process control system, the process control system including the first workstation and a second workstation;
  - create a data model instance representing the first workstation;
  - apply the property value to the data model instance;
  - query a common location to the first workstation and the second workstation to identify a rule associated with the data model instance, the rule accessed from the common location by the first workstation and the second workstation;
  - determine whether an executable package associated with the rule exists in the common location;
  - based on a determination that the executable package associated with the rule does not exist in the common location, access a rule configuration file associated with the rule, the rule configuration file including core logic, a threshold, and a parameter;
  - generate a machine-readable instructions script based on the rule configuration file;
  - compile the machine-readable instructions script into the executable package associated with the rule;
  - store the executable package in the common location;
  - determine whether editing of the core logic of the rule configuration file is permitted;
  - in response to a determination that editing of the core logic is not permitted, apply an update to at least one of (i) the parameter to be utilized during execution of the rule or (ii) the threshold to be utilized during execution of the rule, without recompiling the executable package associated with the rule;
  - cause execution, by the first workstation, of the executable package associated with the rule with the at least one of the updated parameter or the updated threshold using the data model instance; and
  - record a result of the execution of the executable package associated with the rule with at least one of the updated parameter or the updated threshold.

2. The apparatus of claim 1, wherein the result is to indicate a health of the first workstation.

3. The apparatus of claim 1, wherein the processor circuitry is to store an updated rule configuration file in the common location corresponding to the update to at least one of the parameter or the threshold.

4. The apparatus of claim 3, wherein the threshold is in a file separate from the rule.

5. The apparatus of claim 1, wherein the data collector is to receive instructions to retrieve the property value via a network connection.

6. The apparatus of claim 1, wherein the result of the execution of the executable package is presented using a web-based interface.

7. The apparatus of claim 1, wherein the result of the execution of the executable package is stored to a storage device.

8. The apparatus of claim 1, wherein a remote device is to instruct the processor circuitry to at least one of instantiate or execute the machine readable instructions.

9. A non-transitory machine readable storage medium comprising instructions that, when executed, cause processor circuitry to at least:
- access a property value from a data collector, the property value including an operational value of a first workstation within a process control system, the process control system including the first workstation and a second workstation;
- create a data model instance representing the first workstation;
- apply the property value to the data model instance;
- query a common location to the first workstation and the second workstation to identify a rule associated with the data model instance, the rule accessed from the common location by the first workstation and the second workstation;
- determine whether an executable package associated with the rule exists in the common location;
- based on a determination that the executable package associated with the rule does not exist in the common location, access a rule configuration file associated with the rule, the rule configuration file including core logic, a threshold, and a parameter;
- generate a machine-readable instructions script based on the rule configuration file;
- compile the machine-readable instructions script into the executable package associated with the rule;

store the executable package in the common location;

determine whether editing of the core logic of the rule configuration file is permitted;

in response to a determination that editing of the core logic is not permitted, apply an update to at least one of (i) the parameter to be utilized during execution of the rule or (ii) the threshold to be utilized during execution of the rule, without recompiling the executable package associated with the rule;

cause execution, by the first workstation, of the executable package associated with the rule with at least one of the updated parameter or the updated threshold using the data model instance; and record a result of the execution of the executable package associated with the rule with at least one of the updated parameter or the updated threshold.

10. The non-transitory machine readable storage medium of claim 9, wherein the result is to indicate a health of the first workstation.

11. The non-transitory machine readable storage medium of claim 9, wherein the instructions, when executed, cause the processor circuitry to at least store the rule configuration file in the common location corresponding to the update to at least one of the parameter or the threshold.

12. The non-transitory machine readable storage medium of claim 11, wherein the threshold is edited in a file separate from the rule.

13. The non-transitory machine readable storage medium of claim 9, wherein the instructions, when executed, cause the processor circuitry to receive instructions to retrieve the property value via a network connection.

14. The non-transitory machine readable storage medium of claim 9, wherein the instructions, when executed, display the result of the execution of the executable package via a graphical user interface.

15. A method for executing a rule, the method comprising:

accessing a property value from a data collector, the property value including an operational value of a first workstation within a process control system, the process control system including the first workstation and a second workstation;

creating a data model instance representing the first workstation;

applying the property value to the data model instance;

querying a common location to the first workstation and the second workstation to identify a rule associated with the data model instance, the rule accessed from the common location by the first workstation and the second workstation;

determining whether an executable package associated with the rule exists in the common location;

based on a determination that the executable package associated with the rule does not exist in the common location, accessing a rule configuration file associated with the rule, the rule configuration file including core logic, a threshold, and a parameter;

generating a machine-readable instructions script based on the rule configuration file;

compiling the machine-readable instructions script into the executable package associated with the rule;

storing the executable package in the common location;

determining whether editing of the core logic of the rule configuration file is permitted;

in response to a determination that editing of the core logic is not permitted, applying an update to at least one of (i) the parameter to be utilized during execution of the rule or (ii) the threshold to be utilized during execution of the rule, without recompiling the executable package associated with the rule;

causing execution, by the first workstation, of the executable package associated with the rule with the at least one of the updated parameter or the updated threshold using the data model instance; and recording a result of the execution of the executable package associated with the rule with at least one of the updated parameter or the updated threshold.

16. The method of claim 15, wherein the result is to indicate a health of the first workstation.

17. The method of claim 15, further including storing the rule configuration file in the common location corresponding to the update to at least one of the parameter or the threshold.

18. The method of claim 17, wherein the threshold is edited in a file separate from the rule.

19. The method of claim 15, wherein the data collector receives instructions to retrieve the property value via a network connection.

20. The method of claim 15, wherein the result of the execution of the executable package is displayed to at least one of a web-based interface or a graphical user interface.

* * * * *